United States Patent
Kaneko et al.

(10) Patent No.: US 7,030,589 B2
(45) Date of Patent: Apr. 18, 2006

(54) DRIVING SYSTEMS OF AC MOTOR

(75) Inventors: Daigo Kaneko, Hitachi (JP); Yoshitaka Iwaji, Hitachinaka (JP); Kiyoshi Sakamoto, Hitachi (JP); Tsunehiro Endo, Hitachiota (JP); Tomofumi Okubo, Narashino (JP)

(73) Assignee: Hitachi Industrial Equipment Systems Co., Ltd., Chiba (JP)

( * ) Notice: Subject to any disclaimer, the term of this patent is extended or adjusted under 35 U.S.C. 154(b) by 0 days.

(21) Appl. No.: 10/787,435

(22) Filed: Feb. 27, 2004

(65) Prior Publication Data

US 2004/0263114 A1  Dec. 30, 2004

(30) Foreign Application Priority Data

Jun. 27, 2003 (JP) ............................. 2003-183714

(51) Int. Cl.
  *H02P 27/04* (2006.01)
(52) U.S. Cl. .................... 318/802; 318/138; 318/254; 318/439; 318/700; 318/800; 318/801; 318/803; 318/806
(58) Field of Classification Search .............. 318/138, 318/254, 430–434, 700–806, 439
See application file for complete search history.

(56) References Cited

U.S. PATENT DOCUMENTS

| | | | | |
|---|---|---|---|---|
| 6,005,365 A * | 12/1999 | Kaneko et al. | ............. | 318/700 |
| 6,501,243 B1 * | 12/2002 | Kaneko et al. | ............. | 318/700 |
| 6,531,843 B1 * | 3/2003 | Iwaji et al. | ................. | 318/727 |
| 6,639,380 B1 * | 10/2003 | Sul et al. | ..................... | 318/727 |
| 6,696,812 B1 * | 2/2004 | Kaneko et al. | ............. | 318/700 |
| 6,713,981 B1 * | 3/2004 | Nakajima | ................... | 318/491 |
| 6,788,024 B1 * | 9/2004 | Kaneko et al. | ............. | 318/807 |
| 6,844,697 B1 * | 1/2005 | Masaki et al. | ............. | 318/721 |

FOREIGN PATENT DOCUMENTS

| JP | 2000-092891 | 3/2000 |
|---|---|---|
| JP | 2001-095215 | 4/2001 |
| JP | 2002-078392 | 3/2002 |

OTHER PUBLICATIONS

S. Nakashima et al, "Sensorless Initial Rotor Position Estimation of Surface Permanent-Magnet Synchronous Motor", IEEE Transactions on Industry Applications, vol. 36, No. 6, pp. 1598-1603 (2000). USA.

* cited by examiner

*Primary Examiner*—David Martin
*Assistant Examiner*—Tyrone Smith
(74) *Attorney, Agent, or Firm*—Antonelli, Terry, Stout and Kraus, LLP.

(57) ABSTRACT

An AC motor control apparatus that is applicable to commonly used PM motors and capable of detecting the magnetic pole position with simple algorithm. The AC motor control apparatus comprises an inverter for applying arbitrary AC power to an AC motor and a controller for sending a control signal to the inverter. The controller comprises a ripple current generator for supplying a ripple current to the AC motor and a magnetic pole position estimator. The magnetic pole position estimator observes at least two current values of the ripple current for both positive and negative sides of the ripple current to estimate the magnetic pole position of the AC motor.

20 Claims, 11 Drawing Sheets

MPP: Magnetic Pole Position

CP: Current Polarity
CV: Current Variation
MPPE: Magnetic Pole Position Estimation Internal View of Motor Saturation Characteristic L Greater (Ripple Components Smaller) — Variation Depending On Stator Structure — L Smaller (Ripple Components Greater)

dc Axial Current

MPP: Magnetic Pole Position

CP: Current Polarity
CAD: Current Amplitude Difference
MPPE: Magnetic Pole Position Estimation AVC: Adjustment Voltage Command
MPP: Magnetic Pole Position CP: Current Polarity
CAD: Current Amplitude Difference
MPPE: Magnetic Pole Position Estimation
AVC: Adjustment Voltage Command MSC: Motor Starting Command
MPP: Magnetic Pole Position Internal View of Motor Saturation Characteristic dc Axial Current

DRIVING SYSTEMS OF AC MOTOR

FIELD OF THE INVENTION

The present invention relates to AC motor control apparatus and AC motor systems that realize the control of motor operation without using a sensor to detect an electrical angular position.

BACKGROUND OF THE INVENTION

Prior art of controlling a synchronous motor without detecting an electrical angular position is disclosed in, for example, JP-A No. 2002-78392 (hereinafter referred to as Japanese Patent Document 1) which relates to a method for estimating the position of a magnetic pole within the synchronous motor.

JP-A No. 2001-95215 (hereinafter referred to as Japanese Patent Document 2) discloses effects of magnetic saturation occurred locally in a stator of a permanent magnet synchronous motor (PM motor).

The method according to Japanese Patent Document 1 comprises the steps of applying voltage pulses to the synchronous motor in the directions of two axes perpendicular to each other, measuring the amplitudes of the current pulses generated in the directions of both axes, and estimating the magnetic pole position, based on the measurements. In this method, by applying approximation to a relation between the generated currents and the estimated magnetic pole position, compatibility between the number of times of applying the voltage pulses and the accuracy of the estimation is achieved.

However, with regard to the change in ripple components of the above currents due to magnetic saturation, Japanese Patent Document 1 makes an assumption as will be described below. FIGS. 14A to 14C show a relation between permanent magnet flux $\phi_m$ and the generated current $I_{dc}$, which is assumed by Japanese Patent Document 1. FIG. 14A shows a dc axis and the direction of permanent magnet flux $\phi_m$ inside the motor; FIG. 14B shows a relation between the current $I_{dc}$ and the primary flux $\phi_{Id}$; and FIG. 14C is a schematic diagram showing the waveform of the current $I_{dc}$. Here, it is supposed that the dc axis along which the voltage pulses are applied is aligned with the direction of permanent magnet flux $\phi_m$ inside the motor as shown in FIG. 14A. When the direction of the current $I_{dc}$ is aligned with the direction of permanent magnet flux $\phi_m$, the current $I_{dc}$ generates flux in the same direction as the direction of permanent magnet flux $\phi_m$, which acts to accelerate magnetic saturation of the motor core. At this time, inductance $L_{ds0}$ is smaller than inductance $L_{d0}$ that would be measured if the direction of the current $I_{dc}$ is opposite to the direction of permanent magnet flux $\phi_m$, and the current $I_{dc}$ changes as shown in FIG. 14C.

However, in the case that magnetic saturation occurred locally in the stator of the PM motor has an effect as described in Japanese Patent Document 2, the assumption by Japanese Patent Document 1 is not always true, depending on the magnitude of the current $I_{dc}$, and there is a possibility of a major error in estimating the magnetic pole position. The effect of the local magnetic saturation depends on the PM motor structure and can be reduced relatively by increasing the current $I_{dc}$, but may be restricted by a controller that drives the motor.

SUMMARY OF THE INVENTION

An object of the invention is to provide an AC motor control apparatus and an AC motor system that are capable of estimating the magnetic pole position with accuracy.

One feature of the present invention resides in an AC motor control apparatus comprising a controller which sends a control signal to an inverter which supplies arbitrary AC power to an AC motor, the controller comprising a ripple current generator for supplying a ripple current to the AC motor and a magnetic pole position estimator, wherein the magnetic pole position estimator observes at least two current values of the ripple current for both positive and negative sides of the ripple current to estimate the magnetic pole position of the AC motor.

Other features of the present invention are set forth in the appended claims.

DETAILED DESCRIPTION OF THE PREFERRED EMBODIMENTS

Embodiment 1

Figure 1:
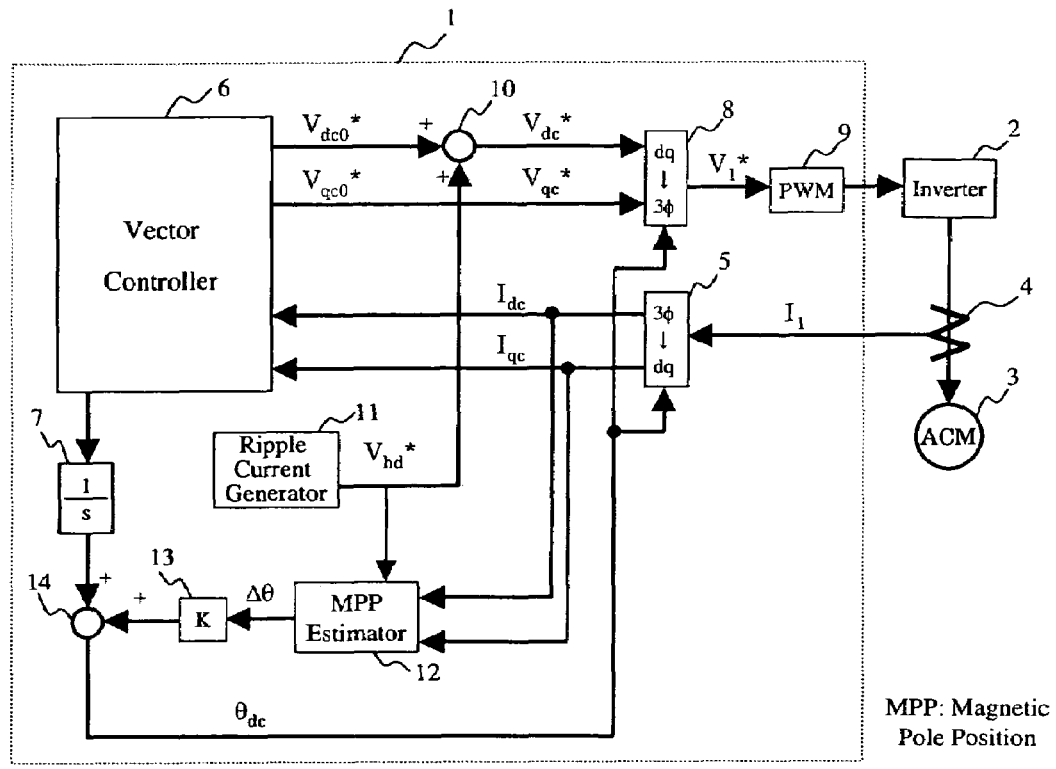
FIG. 1 is a system structural diagram according to a preferred embodiment 1 of the present invention.

FIG. 1 shows a system structural diagram of a preferred embodiment 1 of the present invention. This system has a controller 1 for controlling the motor, an inverter 2 for driving the motor, and a three-phase AC motor 3. The controller 1 includes means for changing voltage applied to a dc axis that is an estimated magnetic pole axis inside the motor 3 and means for observing current flowing across the motor to estimate the magnetic pole position inside the motor, based on a positive period and a negative period of the ripple components of the observed current.

Concretely, the controller 1 is comprised of a current detector 4 for detecting current flowing across the motor 3, a dq converter 5 for performing coordinate conversion from current values into corresponding values on dc and qc axes of rotation coordinates the controller, a vector controller 6 for controlling the speed or torque of the motor 3, an integrator 7 for integrating electrical angular frequency $\omega_1$ of the motor 3 to calculate an electrical angular position (phase) $\theta_{dc}$, a dq inverse converter 8 for performing coordinate conversion from voltage commands $V_{dc}{}^*$ and $V_{qc}{}^*$ on the dc and qc axes into three-phase voltage commands, a PWM generator 9 for generating pulses to control the inverter 2, based on a three-phase voltage command, an adder 10 for adding signals, a ripple current generator 11 for applying a voltage signal to generate a ripple current, a magnetic pole position estimator 12 for calculating a position error $\Delta\theta$ (a difference angle between actual magnetic pole position and the magnetic pole position that the controller assumed) which is a feature of the present invention, a gain corrector 13 for correcting the electrical angular position $\theta_{dc}$, based on the position error $\Delta\theta$, and an adder 14 for correcting the magnetic pole position inside the controller, based on the magnetic pole position estimator.

Then, the operation principle of embodiment 1 is discussed. The vector controller 6 performs calculation to control the speed or torque of the motor 3. Three-phase current values detected by the current detector 4 are converted by the coordinate converter 5 into corresponding values $I_{dc}$ and $I_{qc}$ on the dc and qc axes of the coordinates of rotation inside the controller. The vector controller 6 calculates and outputs values of voltages $V_{dc0}{}^*$ and $V_{qc0}{}^*$ to be applied to the motor 3 to give a predetermined value of the $I_{dc}$ component in the direction along which the magnetic pole of the motor exists and a predetermined value of the $I_{qc}$ component in the direction perpendicular to the above direction. These voltage commands are converted again into three-phase AC voltage quantities which are further converted by the PWM generator 9 into pulse signals to cause the inverter 2 to perform switching operation. The inverter 2 is driven by the signals from the PWM generator 9 to apply voltages corresponding to the voltage commands calculated in the controller 1 to the motor 3.

If the phase (position) $\theta$ of the magnetic pole of the motor 3 can be detected directly by a magnetic pole position detector, the detected three-phase current values can be coordinate converted, based on the detected phase. An exciting current component $I_{dc}$ and a torque current component $I_{qc}$ can therefore be obtained. The vector controller 6 controls these two current components separately and has a torque current command and an exciting current command to give desired speed and torque of the motor 3. The vector controller 6 changes the values of voltages $V_{dc0}{}^*$ and $V_{qc0}{}^*$ to make the detected $I_{dc}$ and $I_{qc}$ values equal to these command values.

As described above, it is necessary to detect the magnetic pole position inside the motor to perform vector control. The motor driving system according to the present invention is arranged to detect the magnetic pole position inside the motor without using the magnetic pole position detector (sensor).

Next, the magnetic pole position estimator which is a feature of embodiment 1 is explained.

Figure 2:
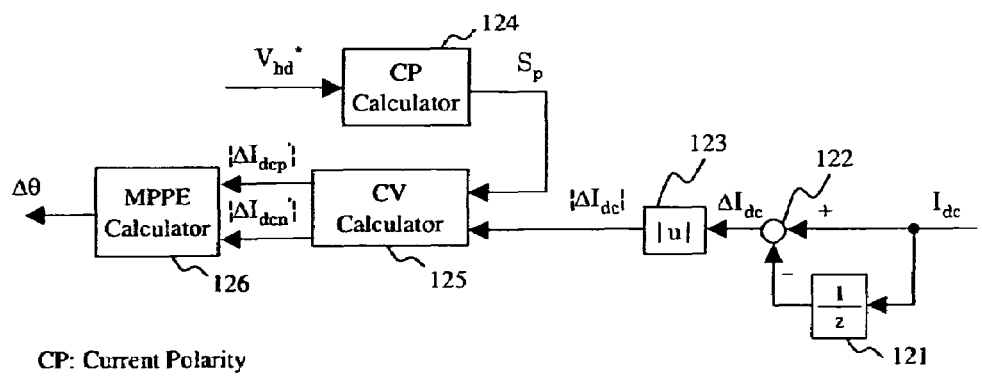
FIG. 2 is a configuration diagram of a magnetic pole position estimator according to embodiment 1 of the present invention.
Figure 3:
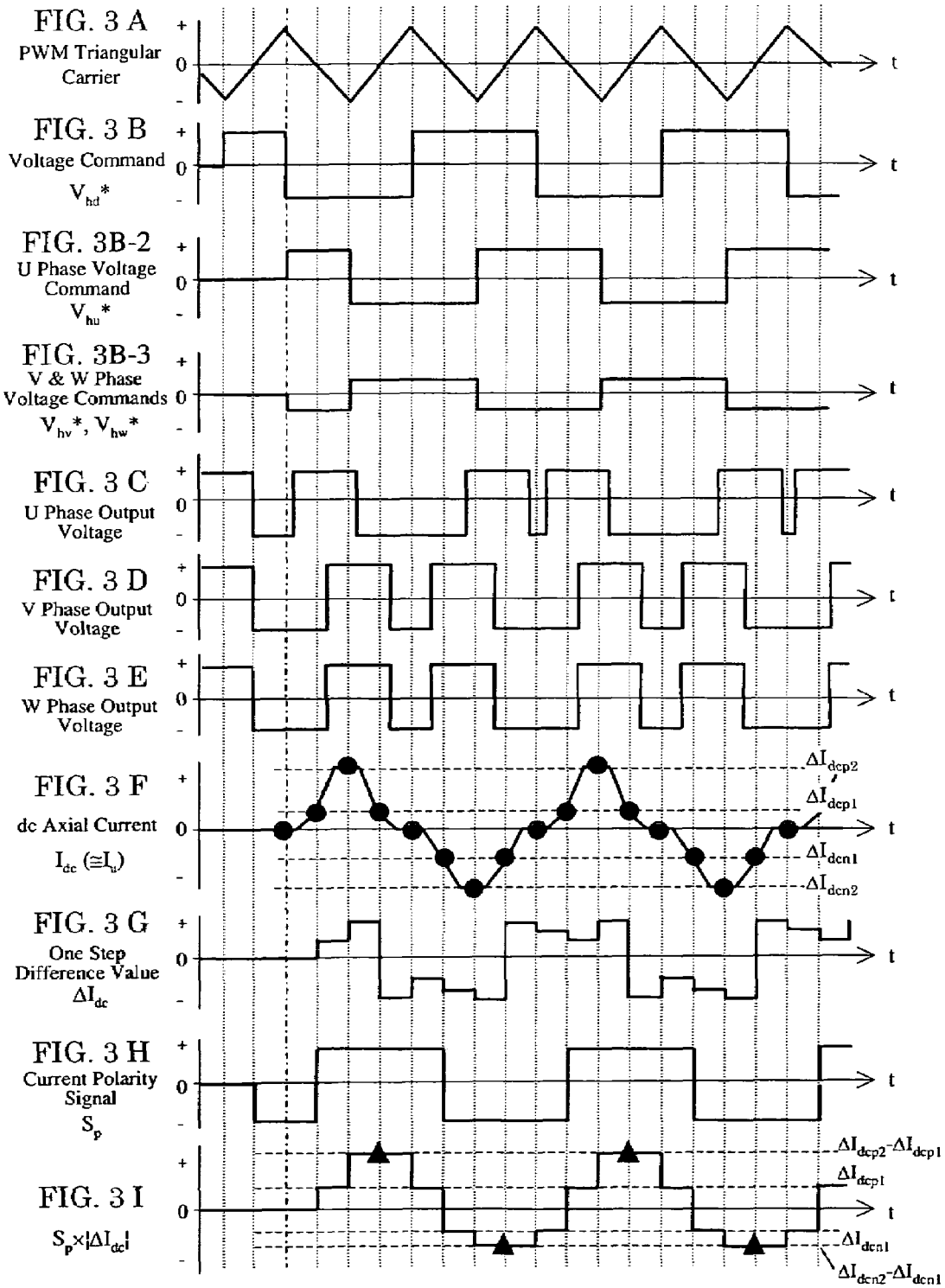
FIGS. 3A to 3I show waveform timing charts to explain controller operation according to embodiment 1 of the present invention.

FIG. 2 shows a configuration example of the magnetic pole position estimator 12. FIG. 3 shows waveform timing charts to explain the operation of magnetic pole position estimator 12 when the ripple current generator 11 gives a voltage command $V_{hd}{}^*$. Here, it is assumed that the three-phase AC motor 3 is now in a stop state, and the dc axis phase is in a U phase of the stator of the three-phase AC motor 3 in the initial state, and the inverter output undergoes pulse width modulation. Here, FIG. 3A shows a PWM triangular carrier and it is assumed that one cycle of calculating operation is a half carrier waveform period.

In embodiment 1, the voltage command $V_{hd}{}^*$ shown in FIG. 3B is a rectangular waveform voltage whose period is double the PWM triangular carrier waveform period. At this time, the $V_{hd}{}^*$ voltage is converted into three-phase AC voltage quantities, namely, U, V, and W phase voltage commands $V_{hu}{}^*$, $V_{hv}{}^*$, and $V_{hw}{}^*$, delayed by a half waveform period of the PWM triangular carrier corresponding to one cycle of calculating operation of the controller, as shown in FIGS. 3B-2 and 3B-3. Furthermore, the U, V and W voltage commands undergoes pulse width modulation into U, V, and W phase voltages which are output as shown in FIGS. 3C, 3D, and 3E, respectively.

These voltage outputs generate a ripple current in the three-phase AC motor. FIG. 3F shows a dc axial current $I_{dc}$ output from the coordinate converter. Values of the current are detected at timing marked with dots on the waveform shown in FIG. 3F. At this time, two pair of different absolute values for both the positive polarity and the negative polarity of the current are obtained, namely, $\Delta I_{dcp1}$ and $\Delta I_{dcp2}$ for a positive half wave and $\Delta I_{dcn1}$ and $\Delta I_{dcn2}$ for a negative half wave.

Using a delayer 121 and a subtracter 122, the magnetic pole position estimator calculates a one step difference value $\Delta I_{dc}$ for the obtained current values. The one step difference value $\Delta I_{dc}$ output from the subtracter 122 is shown in FIG. 3G. Here, an operation delay occurs by one cycle of detecting the current values. From this one step difference value $\Delta I_{dc}$, an absolute value calculator 123 obtains its absolute value $|\Delta I_{dc}|$. On the other hand, a current polarity calculator 124 obtains a current polarity signal Sp that indicates the polarity of the generated dc axial current $I_{dc}$, based on the voltage command $V_{hd}{}^*$. This signal $S_p$ should be preferably a rectangular waveform signal that changes in time with a signal having a delay time equal to the sum of a delay for one cycle of calculating operation of the controller to output the pulse width modulated voltages, a delay for one cycle of detecting the current values to calculate the one step difference value $\Delta I_{dc}$, and a delay for a quarter waveform period of the ripple current shown in FIG. 3F, relative to the voltage command $V_{hd}{}^*$. In the instance of embodiment 1, the current polarity signal $S_p$ is obtained by delaying the voltage command $V_{hd}{}^*$ by one cycle of detecting the current values and inverting its polarity, as shown in FIG. 3H.

A current variation calculator 125 calculates $|\Delta I_{dcp}'|$ and $|\Delta I_{dcn}'|$ in the following equation (1) by following a procedure that will be described below.

[Equation 1]

$$\Delta I_{dcp}'=\Delta I_{dcp2}-\Delta I_{dcp1},\ \Delta I_{dcn}'=\Delta I_{dcn2}-\Delta I_{dcn1} \quad (1)$$

First, the current polarity signal $S_p$ is multiplied to the absolute value $|\Delta I_{dc}|$. As a result, a signal including $|\Delta I_{dcp}'|$ and $|\Delta I_{dcn}'|$ is generated, as shown in FIG. 3I. Then, values are extracted from the waveform of FIG. 3I at timing marked with black triangles. Timing marked with the black triangles should be in the center between two successive points at which the polarity of the current polarity signal $S_p$ changes. The magnetic pole position estimator 12 calculates the position error $\Delta\theta$, based on the thus obtained $|\Delta I_{dcp}'|$ and $|\Delta I_{dcn}'|$.

Figure 4:
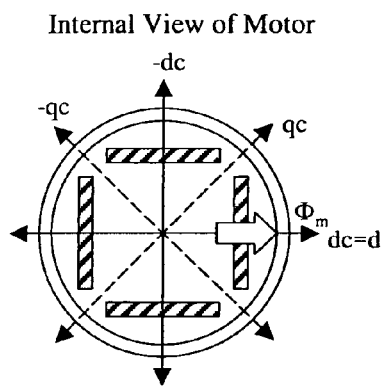
FIG. 4A shows an internal view of the motor to control.
FIG. 4B shows a current-flux relation.
FIG. 4C shows the waveform of the current in order to explain a relation between magnetic saturation and ripple current if a magnetic pole axis is aligned with the estimated axis.
Figure 4:
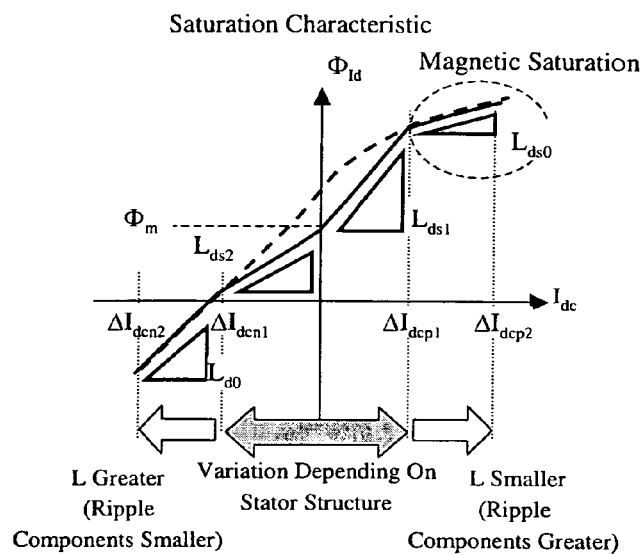
Figure 4:
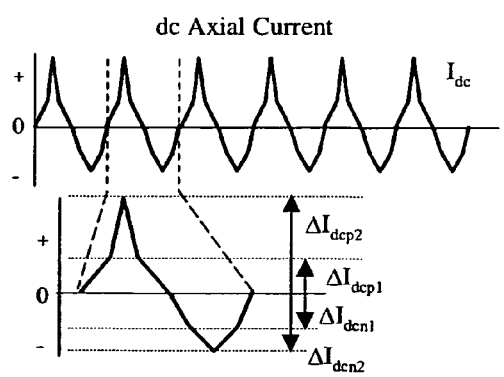

Next, the operation principle of estimating the magnetic pole position in embodiment 1 is discussed. FIG. 4 shows a relation between permanent magnets inside the motor and the dc axial current $I_{dc}$ generated. FIG. 4A shows the dc axis and the direction of permanent magnet flux $\phi_m$ inside the motor; FIG. 4B is a schematic diagram showing a relation between the dc axial current $I_{dc}$ and the primary flux $\phi_{Id}$; and FIG. 4C shows the waveform of the dc axial current $I_{dc}$. In the following, it is assumed that the dc axis is aligned with the direction of permanent magnet flux $\phi_m$ inside the motor as shown in FIG. 4A.

Under the effect of the permanent magnet flux $\phi_m$, the dc axial current $I_{dc}$ changes asymmetrically with regard to its polarity. This is because the permanent magnet flux $\phi_m$ causes the change of inductance ($L \propto dI/dt$) with regard to the polarity of the dc axial current $I_{dc}$. Here, when inductance in the positive direction of the dc axis is denoted by $L_{ds0}$ and inductance in the negative direction of the dc axis is denoted by $L_{d0}$, there is a relation $L_{ds0} < L_{d0}$.

Meanwhile, if the dc axial current $I_{dc}$ is small, the inductance is more easily affected by, for example, the stator structure of the motor. Then the inductance becomes $L_{ds1}$ in the positive direction of the dc axis and $L_{ds2}$ in the negative direction of the dc axis. In FIG. 4B, it is assumed that $L_{d0} > L_{ds2}$ and $L_{ds1} > L_{ds0}$.

When the dc axial current $I_{dc}$ is small ($\Delta I_{dcn1} < I_{dc} < \Delta I_{dcp1}$), $I_{dc}$ changes, depending on $L_{ds1}$ in the positive direction of the dc axis, and $L_{ds2}$ in the negative direction of the dc axis. When the dc axial current $I_{dc}$ becomes large ($I_{dc} < \Delta I_{dcn1}$ or $\Delta I_{dcp1} < I_{dc}$), $I_{dc}$ changes, depending on $L_{ds0}$ in the positive direction of the dc axis, and $L_{d0}$ in the negative direction of the dc axis.

$L_{ds0}$ and $L_{d0}$ of the inductances are necessary to estimate the position error $\Delta\theta$. However, actually detected quantities $\Delta I_{dcp2}$ and $\Delta I_{dcn2}$ of the dc axial current $I_{dc}$ involve the effect of $L_{ds0}$ and $L_{ds1}$ Δ and the effect of $L_{d0}$ and $L_{ds2}$, respectively. The relation between the waveform of the dc axial current $I_{dc}$ and the detected current values $\Delta I_{dcp1}$, $\Delta I_{dcn1}$, $\Delta I_{dcp2}$, and $\Delta I_{dcn2}$ is shown in FIG. 4C. Then, $|\Delta I_{dcp}'|$ and $|\Delta I_{dcn}'|$ are obtained, according to the equations of $|\Delta I_{dcp}'|$ and $|\Delta I_{dcn}'|$, respectively. $|\Delta I_{dcp}'|$ is obtained as a component of the dc axial current $I_{dc}$ which changes depending on $L_{ds0}$. $|\Delta I_{dcn}'|$ is obtained as a component of the dc axial current $I_{dc}$ which changes depending on $L_{d0}$. Thus, the effect of inductance variation due to the permanent magnet flux $\phi_m$ can be extracted as change in the dc axial current $I_{dc}$.

By the way, with respect to $|\Delta I_{dcp}'|$ and $|\Delta I_{dcn}'|$ and position error $\Delta\theta$, approximation like, for example, equation (2) below, may be applied.

[Equation 2]

$$|\Delta I_{dcp}'|-|\Delta I_{dcn}'| \propto \cos(\Delta\theta) \quad (2)$$

If this approximation is applied, the range of estimated position error $\Delta\theta$ is within $\pm\pi/2$.

According to embodiment 1, the accuracy of estimating the position error $\Delta\theta$ can be enhanced without being affected by inductance variation due to the stator structure of the motor.

Embodiment 2

In embodiment 1, timing to detect the current values must be synchronous with peak and intermediate values of the PWM triangular carrier, as shown in FIG. 3. However, software processing may be complicated to generate timing synchronous with the intermediate values of the PWM triangular carrier.

Figure 5:
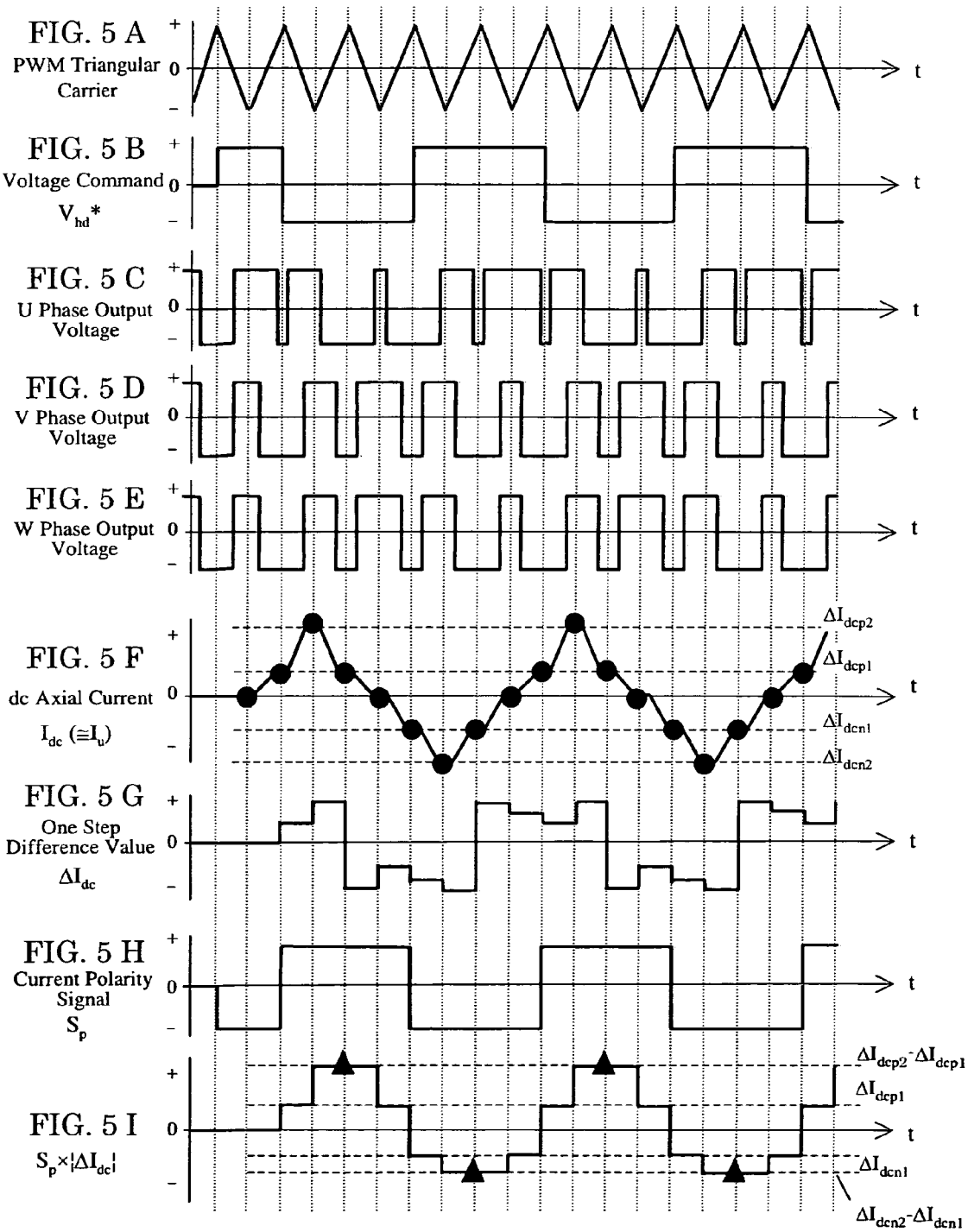
FIG. 5 is a waveform timing chart to explain controller operation according to a preferred embodiment 2 of the present invention.

Thus, in a preferred embodiment 2 of the present invention, the overall system structure is the same as that shown in FIG. 1 is applied as well, but the voltage command $V_{hd}^*$ has a pulse period that is four times the PWM triangular carrier waveform period, as is shown in FIG. 5B. The magnetic pole position estimator 12 operates in the same way as that of embodiment 1 except that the current polarity signal Sp with polarity opposite to that of the $V_{hd}^*$ is obtained. At this time, timing to detect the current values is synchronous with the peak values of the PWM triangular carrier, as indicated by the dots on the waveform of FIG. 5F. Therefore, according to embodiment 2, the current values can simply be detected at timing synchronous with the peak values of the PWM triangular carrier and it is easy to generate timing to detect the current values.

Furthermore, in embodiment 2, if the $V_{hd}^*$ pulse period is defined as 2n (n is an integer of 2 or greater) times the PWM triangular carrier waveform period, then the waveform period of the dc axial current $I_{dc}$ is 4n times the half waveform period of the PWM triangular carrier. Thus, n or less than n different absolute values for positive and negative sides of the dc axial current $I_{dc}$ can be obtained by detecting the current values at timing synchronous with the peak values of the PWM triangular carrier.

Embodiment 3

Figure 6:
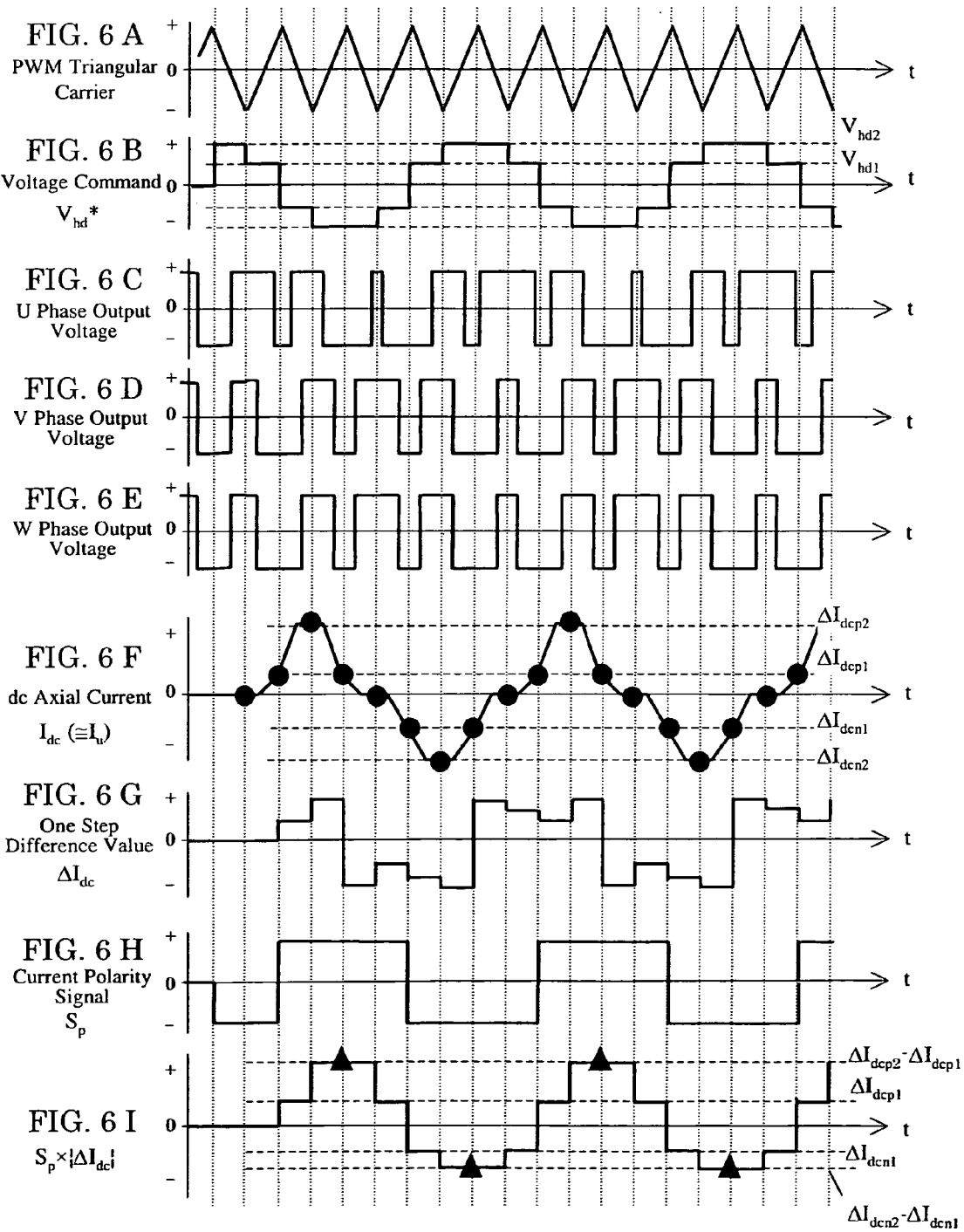
FIG. 6 is a waveform timing chart to explain controller operation according to a preferred embodiment 3 of the present invention.

In a preferred embodiment 3 of the present invention, the overall system structure is the same as that shown in FIG. 1, but the voltage command $V_{hd}^*$ with a pulse period that is four times the PWM triangular carrier waveform period. The voltage $V_{hd}^*$ is a stepwise waveform such that its amplitude changes in two steps $V_{hd1}$ and $V_{hd2}$, as shown in FIG. 6B. For example, while keeping the average $(V_{hd1}+V_{hd2})/2$ of the amplitude of $V_{hd}^*$ constant, by changing the values of $V_{hd1}$ and $V_{hd2}$, the values of $\Delta I_{dcp1}$ and $\Delta I_{dcn1}$ can be changed, while the peak values $\Delta I_{dcp2}$ and $\Delta I_{dcn2}$ of the dc axial current $I_{dc}$ remain constant. The values of $\Delta I_{dcp1}$ and $\Delta I_{dcn1}$ in embodiment 2 of the present invention correspond to those obtained when $V_{hd1}=V_{hd2}$ in embodiment 3. However, in embodiment 3, a ratio between $V_{hd1}$ and $V_{hd2}$ can be selected arbitrarily and, therefore, the values of $\Delta I_{dcp1}$ and $\Delta I_{dcp1}$ can be set in order not to be affected by inductance variation due to the stator structure, while the peak values $\Delta I_{dcp2}$ and $\Delta I_{dcn2}$ of the dc axial current $I_{dc}$ remain unchanged.

Therefore, according to embodiment 3, the accuracy of estimating the position error $\Delta\theta$ can be enhanced without increasing the dc axial current $I_{dc}$.

As is the case in embodiment 2, n or less than n different absolute values for positive and negative sides of the dc axial current $I_{dc}$ can be obtained by setting the $V_{hd}*$ pulse period 2n (n is an integer of 2 or greater) times the PWM triangular carrier waveform period.

Embodiment 4

Figure 7:
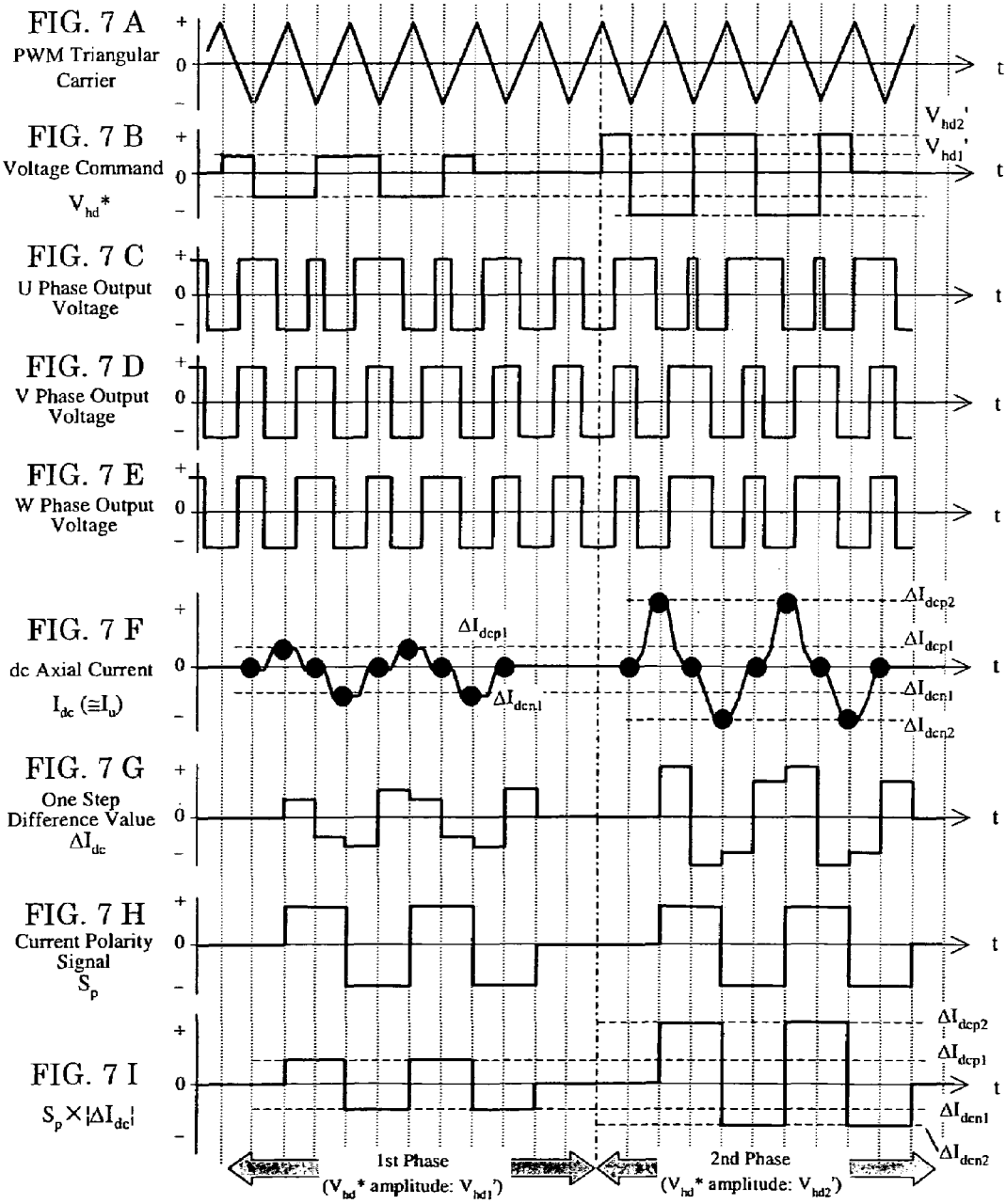
FIG. 7 is a waveform timing chart to explain controller operation according to a preferred embodiment 4 of the present invention.

In a preferred embodiment 4 of the present invention, the overall system structure is the same as that shown in FIG. 1, but the magnetic pole position estimating operation is divided into two phases: first phase and second phase as shown in FIGS. 7A to 7I. The voltage command $V_{hd}*$ consists of two rectangular waveform voltages with different amplitudes which are applied in two phases, respectively. Specifically, as is shown in FIG. 7B, $V_{hd}*$ with amplitude of $V_{hd1}'$ is applied in the first phase and $V_{hd}*$ with amplitude of $V_{hd2}'$ is applied in the second phase. The pulse period of $V_{hd}*$ is two times the PWM angular carrier waveform period in each phase. Timing to detect the values of the dc axial current $I_{dc}$ is synchronous with the peak values of the PWM triangular carrier, as indicated by the dots on the waveform of FIG. 7F. The current values $\Delta I_{dcp1}$ and $\Delta I_{dcn1}$ are to be detected in the first phase and the current values $\Delta I_{dcp2}$ and $\Delta I_{dcn2}$ are to be detected in the second phase.

In embodiment 4, as is shown in FIG. 7I, the product of multiplication of the current polarity signal $S_p$ by the absolute value $|\Delta I_{dc1}|$ does not involve information of $|\Delta I_{dcp}'|$ and $|\Delta I_{dcn}'|$. However, the maximum values $\Delta I_{dcp1}$, $\Delta I_{dcn1}$, $\Delta I_{dcp2}$, and $\Delta I_{dcn2}$ of the dc axial current $I_{dc}$ in each phase are detected. Accordingly, the current variation calculator 125 operates as follows: the current variation calculator 125 obtains $\Delta I_{dcp1}$ and $\Delta I_{dcn1}$ in the first phase and $\Delta I_{dcp2}$ and $\Delta I_{dcn2}$ in the second phase as the products of multiplication of the current polarity signal $S_p$ by the absolute value $|\Delta I_{dcp}'|$ and, upon the completion of both the first and second phases, it obtains $|\Delta I_{dcp}'|$ and $|\Delta I_{dcn}'|$.

In embodiment 4, $V_{hd1}'$ and $V_{hd2}'$ can be set separately. By setting the values of $\Delta I_{dcp1}$ and $\Delta I_{dcn1}$ not to be affected by inductance variation due to the stator structure, while the peak values $\Delta I_{dcp2}$ and $\Delta I_{dcn2}$ of the dc axial current $I_{dc}$ remain unchanged, the accuracy of estimating the position error $\Delta\theta$ can be enhanced without increasing the dc axial current $I_{dc}$. $\Delta I_{dcp1}$ and $\Delta I_{dcn1}$ are equal to the positive and negative peak values of the dc axial current $I_{dc}$ in the first phase and $\Delta I_{dcp2}$ and $\Delta I_{dcn2}$ are equal to such values in the second phase. Thus, $\Delta I_{dcp1}$, $\Delta I_{dcn1}$, $\Delta I_{dcp2}$, and $\Delta I_{dcn2}$ may be used as detected values for the positive and negative sides of the current without calculating the one step difference value and $\Delta I_{dcp}'$ and $\Delta I_{dcn}'$ can be obtained by equation (1). In this case, calculation processing can be simplified.

In embodiments 1 through 4, the voltage command $V_{hd}*$ is a rectangular waveform voltage that alternates between the positive and negative sides of one phase axis (dc axis). In this case, it is possible to estimate the magnetic pole position only in the range of $\pm\pi/2$ of electrical angles and, an estimation error $\pm\pi$ may exist essentially. Therefore, in order to realize estimation of the magnetic pole position within $\pm\pi$ of electrical angles, it is necessary to use a plurality of the above-mentioned phase axes.

Embodiment 5

Figure 8:
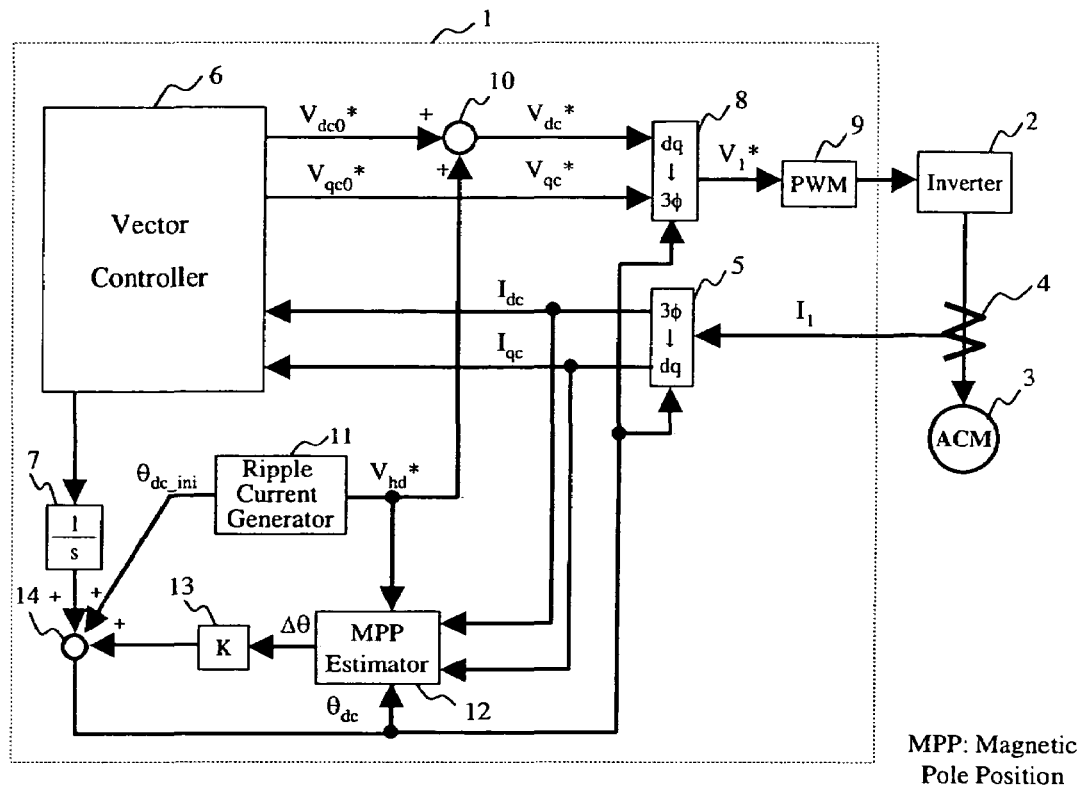
FIG. 8 is a system structural diagram according to a preferred embodiment 5 of the present invention.

FIG. 8 shows a system structure of a preferred embodiment 5 of the present invention. This system differs from the system of FIG. 1 in that the ripple current generator 11 outputs a dc axis phase command $\theta_{dc\_ini}$ simultaneously with the voltage command $V_{hd}*$ to cause the voltage change and that $\theta_{dc\_ini}$ is supplied to the input of the adder 14. In this structure, the voltage changes in an arbitrary phase of the motor can be achieved by controlling $\theta_{dc\_ini}$.

Figure 9:
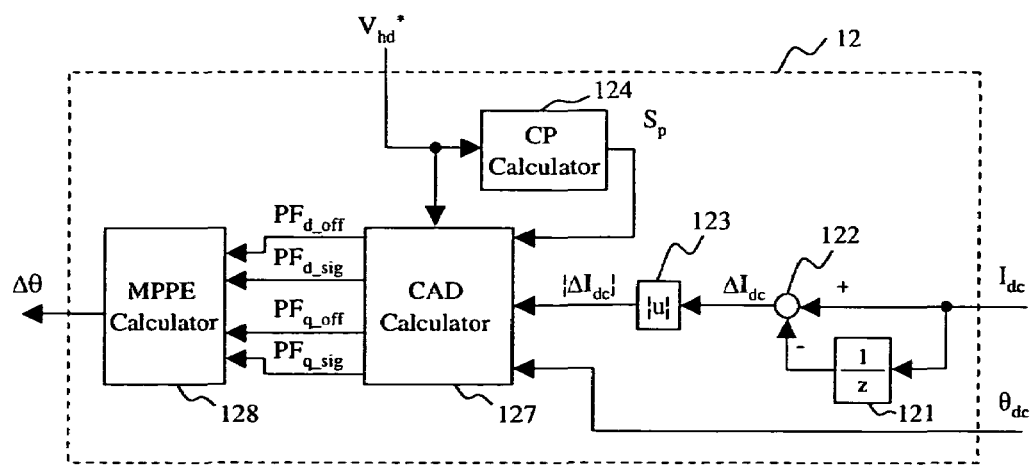
FIG. 9 is a configuration diagram of a magnetic pole position estimator according to embodiment 5 of the present invention.
Figure 10:
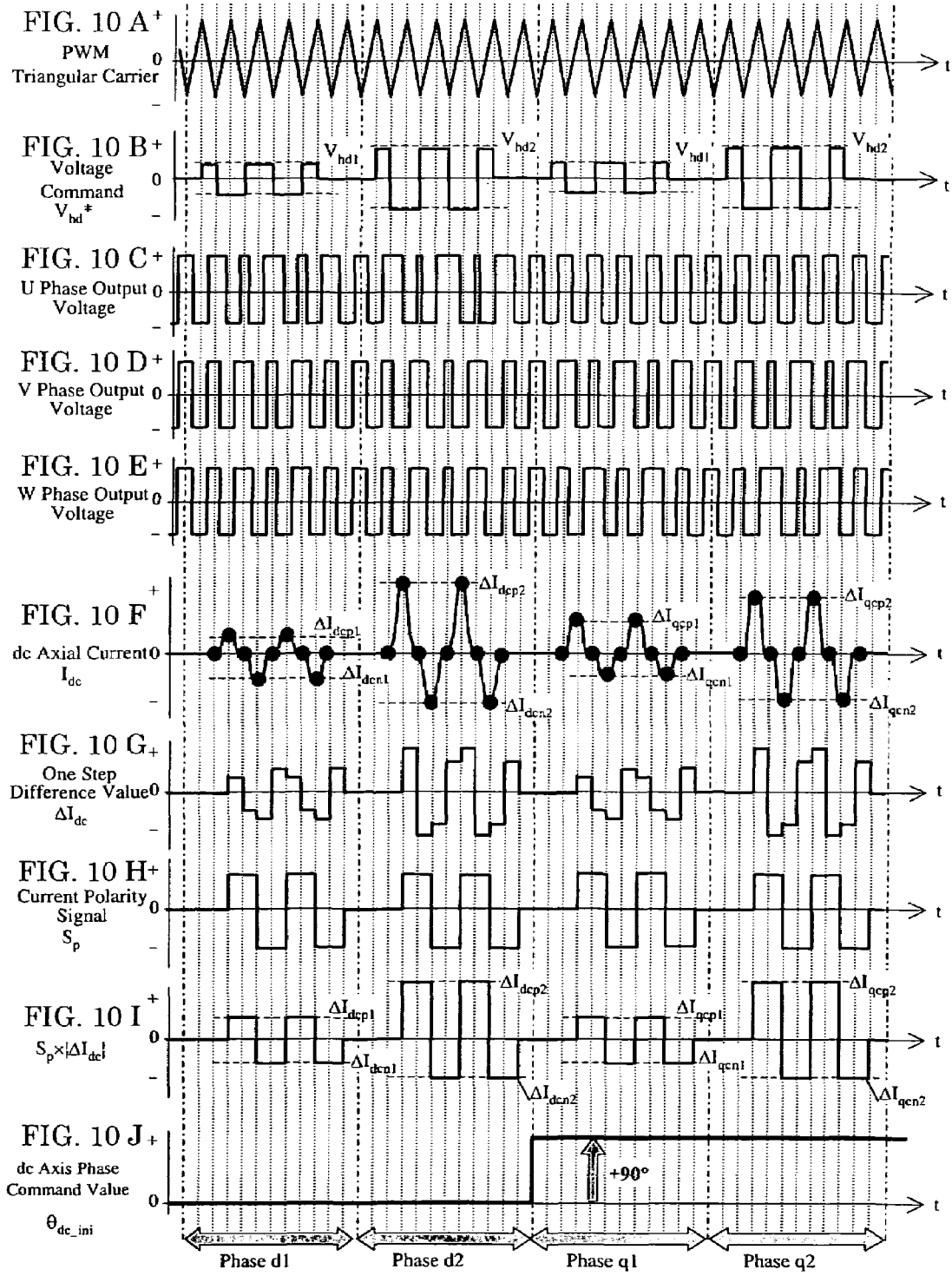
FIG. 10 is a waveform timing chart to explain controller operation according to embodiment 5 of the present invention.

FIG. 9 is a configuration diagram of the magnetic pole position estimator 12 in embodiment 5. FIGS. 10A to 10J show waveform timing charts to explain the operation of the magnetic pole position estimator 12 when the ripple current generator 11 gives the voltage command $V_{hd}*$. In this embodiment, as is shown in FIG. 10J, the dc axis phase command $\theta_{dc\_ini}$ to cause the voltage change is changed by 90 degrees to cause the voltage change in two directions perpendicular to each other. In each of two states that $\theta_{dc\_ini}$ is 0° and that $\theta_{dc\_ini}$ is 90°, the voltage command $V_{hd}*$ consists of two rectangular waveform voltages with different amplitudes and with pulse period that is double the PWM angular carrier waveform period, which are applied in sequence, as is the case in embodiment 4. This operation is divided into four phases: phase d1 during which $\theta_{dc\_ini}$ is 0° and $V_{hd}*$ with amplitude of $V_{hd1}'$ is applied; phase d2 during which $\theta_{dc\_ini}$ is 0° and $V_{hd}*$ with amplitude of $V_{hd2}'$ is applied; phase q1 during which $\theta_{dc\_ini}$ is 90° and $V_{hd}*$ with amplitude of $V_{hd1}'$ is applied; and phase q2 during which $\theta_{dc\_ini}$ is 90° and $V_{hd}*$ with amplitude of $V_{hd2}'$ is applied.

In the phase d1, at the start of processing, first, the amplitude of the voltage command $V_{hd}*$ is set at $V_{hd1}'$ and the dc axis phase command $\theta_{dc\_ini}$ to cause the voltage change is set at 0°. Then, the ripple current generator 11 applies the $V_{hd}*$ for a preset number of cycles. In FIGS. 10A to 10J, the number of cycles is set to 2. At this time, the $V_{hd}*$ undergoes pulse width modulation into U, V, and W phase voltages which are output as shown in FIGS. 10C, 10D, and 10E, respectively, delayed by a half waveform period of the PWM triangular carrier corresponding to one cycle of calculating operation of the controller. The dc axial current $I_{dc}$ which is generated by these voltage outputs is shown in FIG. 10F. Values of the current are detected at timing marked with dots on the waveform shown in FIG. 10F and current values, $\Delta I_{dcp1}$ for positive half waves and $\Delta I_{dcn1}$ for negative half waves, are obtained. For the thus obtained current values, the one step difference value $\Delta I_{dc}$ calculated through the delayer 121 and the subtracter 122 is as shown in FIG. 10G. From $\Delta I_{dc}$, the absolute value calculator 123 obtains its absolute value $|\Delta I_{dc}|$. On the other hand, the current polarity calculator 124 obtains the current polarity signal $S_p$, based on the voltage command $V_{hd}*$. A current amplitude difference calculator 127 which is a feature of embodiment 5 obtains an integrated value $PF_{d\_off}$ of difference between amplitude $\Delta I_{dcp1}$ to the positive polarity and amplitude $\Delta I_{dcn1}$ to the negative polarity of the current $I_{dc}$ generated when the rectangular waveform voltage with amplitude of $V_{hd1}'$ is applied in the direction that $\theta_{dc\_ini}=0°$.

[Equation 3]

$$PF_{d\_off}=\int(|\Delta I_{dcp1}|-|\Delta I_{dcn1}|)dt \qquad (3)$$

After this integrated value is calculated, the processing proceeds to the phase d2.

In the phase d2, at the start of processing, the amplitude of the voltage command $V_{hd}*$ is set at $V_{hd2}'$ and the dc axis phase command $\theta_{dc\_ini}$ to cause the voltage change is set at 0°. Then, the ripple current generator 11 applies the $V_{hd}*$ for the preset number of cycles. As is the case of the phase d1, the U, V, and W phase voltages modulated from the $V_{hd}*$ are output and the dc axial current $I_{dc}$ is generated. The detected current values, $\Delta I_{dcp2}$ for positive half waves and $\Delta I_{dcn2}$ for negative half waves are different from those detected in the phase d1. In this phase d2, the current amplitude difference calculator 127 obtains an integrated value $PF_{d\_sig}$ of difference between amplitude $\Delta I_{dcp2}$ to the positive polarity and amplitude $\Delta I_{dcn2}$ to the negative polarity of the current $I_{dc}$ generated when the rectangular waveform voltage with amplitude of $V_{hd}2'$ is applied in the direction that $\theta_{dc\_ini}=0°$.

[Equation 4]

$$PF_{d\_sig}=\int(|\Delta I_{dcp2}|-|\Delta I_{dcn2}|)dt \quad (4)$$

After this integrated value is calculated, the processing proceeds to the phase q1.

In the phase q1, at the start of processing, the amplitude of the voltage command $V_{hd}^*$ is set at $V_{hd1}'$ and the dc axis phase command $\theta_{dc\_ini}$ to cause the voltage change is set at 90°. Then, the ripple current generator 11 applies the $V_{hd}^*$ for the preset number of cycles. As is the case of the phase d1, the U, V, and W phase voltages pulse width modulated from the $V_{hd}^*$ are output and the dc axial current $I_{dc}$ is generated. The current values, $\Delta I_{qcp1}$ for positive half waves and $\Delta I_{qcn1}$ for negative half waves are different from those detected in the phase d1. In this phase q1, the current amplitude difference calculator 127 obtains an integrated value $PF_{q\_off}$ of difference between amplitude $\Delta I_{qcp1}$ to the positive polarity and amplitude $\Delta I_{qcn1}$ to the negative polarity of the current $I_{dc}$ generated when the rectangular waveform voltage with amplitude of $V_{hd1}'$ is applied in the direction that $\theta_{dc\_ini}=90°$.

[Equation 5]

$$PF_{q\_off}=\int(|\Delta I_{qcp1}|-|\Delta I_{qcn1}|)dt \quad (5)$$

After this integrated value is calculated, the processing proceeds to the phase q2.

In the phase q2, at the start of processing, the amplitude of the voltage command $V_{hd}^*$ is set at $V_{hd2}'$ and the dc axis phase command $\theta_{dc\_ini}$ to cause the voltage change is set at 90°. Then, the ripple current generator 11 applies the $V_{hd}^*$ for the preset number of cycles. As is the case of the phase d1, the U, V, and W phase voltages modulated from the $V_{hd}^*$ are output and the dc axial current $I_{dc}$ is generated. The detected current values, $\Delta I_{qcp2}$ for positive half waves and $\Delta I_{qcn2}$ for negative half waves are different from those detected in the phase d1. In this phase q2, the current amplitude difference calculator 127 obtains an integrated value $PF_{q\_sig}$ of difference between amplitude $\Delta I_{qcp2}$ to the positive polarity and amplitude $\Delta I_{qcn2}$ to the negative polarity of the current $I_{dc}$ generated when the rectangular waveform voltage with amplitude of $V_{hd2}'$ is applied in the direction that $\theta_{dc\_ini}=90°$.

[Equation 6]

$$PF_{q\_sig}=\int(|\Delta I_{qcp2}|-|\Delta I_{qcn2}|)dt \quad (6)$$

The thus obtained $PF_{d\_off}$, $PF_{d\_sig}$, $PF_{q\_off}$, and $PF_{q\_sig}$ have the following relations. First, a relation between $PF_{d\_off}$ and $PF_{d\_sig}$ is expressed as follows:

[Equation 7]

$$PF_{d\_sig} - PF_{d\_off} = \int(|\Delta I_{dcp2}|-|\Delta I_{dcn2}|)dt - \int(|\Delta I_{dcp1}|-|\Delta I_{dcn1}|)dt \quad (7)$$

$$= \int(|\Delta I_{dcp2}|-|\Delta I_{dcp1}|)dt -$$

$$\int(|\Delta I_{dcn2}|-|\Delta I_{dcn1}|)dt$$

$$= \int(|\Delta I_{dcp'}|-|\Delta I_{dcn'}|)dt$$

$PF_{d\_off}$ and $PF_{d\_sig}$ are $PF_{q\_off}$ and $PF_{q\_sig}$ when 90 degree rotation and the voltage change occur by the voltage applied by the ripple current generator 11. Therefore, by applying approximation equation (1) provided in embodiment 1, the following are obtained:

[Equation 8]

$$PF_{d\_sig}-PF_{q\_off} \propto \cos(\Delta\theta) \quad (8)$$

[Equation 9]

$$PF_{q\_sig}-PF_{q\_off} \propto \sin(\Delta\theta) \quad (9)$$

From these, the magnetic pole position estimator 12 estimates the position error $\Delta\theta$, according to the following equation:

[Equation 10]

$$\Delta\theta = \tan^{-1}\left(-\frac{PF_{q\_sig} - PF_{q\_off}}{PF_{d\_sig} - PF_{d\_off}}\right) \quad (10)$$

Using this equation (10), a position error $\Delta\theta$ can be estimated within $\pm\pi$.

In embodiment 5, the ripple current generator 11 is arranged to apply a voltage to cause the voltage change in two directions perpendicular to each other and, consequently, estimating the magnetic pole position within $\pm\pi$ of electrical angles can be achieved.

While, in this embodiment, the voltage commands $V_{hd}^*$ are applied to cause the voltage change in the order of the phases d1, d2, q1, and q2, the order of these phases may be changed arbitrarily. Even if the order is changed, magnetic pole position estimation and calculation can be executed in the same procedure.

$\Delta I_{dcp1}$ and $\Delta I_{dcn1}$ are the positive and negative peak values of the dc axial current $I_{dc}$ in the phase d1, and $\Delta I_{dcp2}$ and $\Delta I_{dcn2}$ are such values in the phase d2. $\Delta I_{qcp1}$ and $\Delta I_{qcn1}$ are such values in the phase q1, and $\Delta I_{qcp2}$ and $\Delta I_{qcn2}$ are such values in the phase q2. Therefore, by using $\Delta I_{dcp1}$, $\Delta I_{dcn1}$, $\Delta I_{dcp2}$, $\Delta I_{dcn2}$, $\Delta I_{qcp1}$, $\Delta I_{qcn1}$, $\Delta I_{qcp2}$, and $\Delta I_{qcn2}$ as detected values for the positive and negative sides of the current without calculating the one step difference value and by applying equations (3) to (6), calculation processing can be simplified.

Embodiment 6

Figure 11:
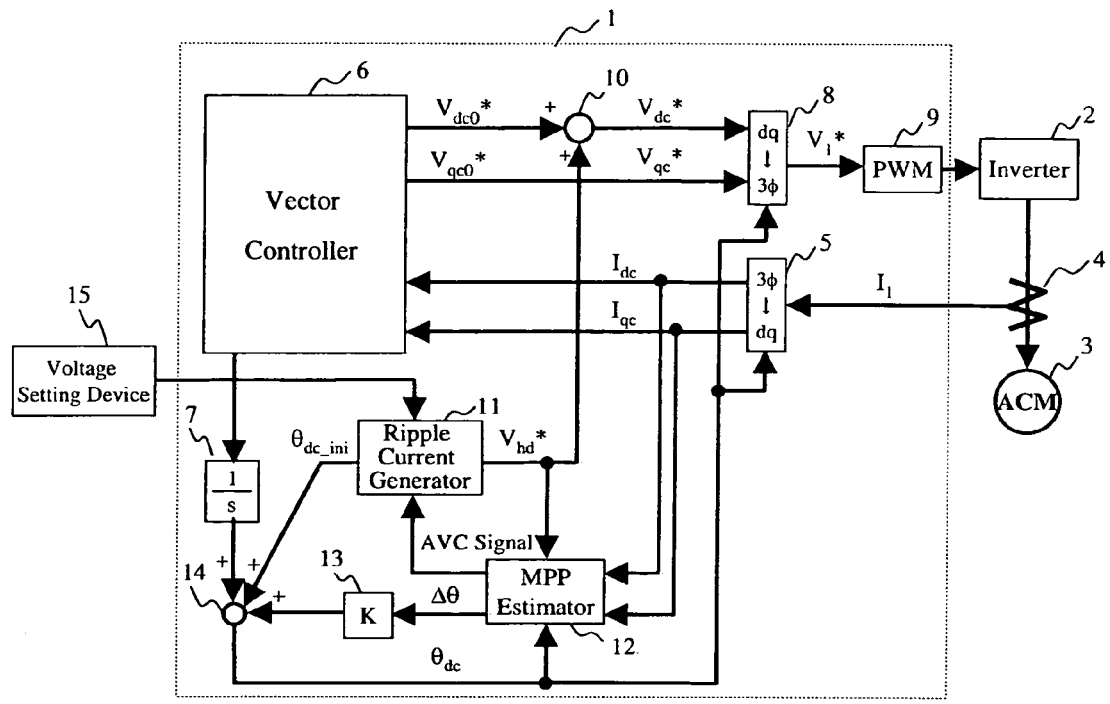
FIG. 11 is a system structural diagram according to a preferred embodiment 6 of the present invention.

FIG. 11 shows a system structure of a preferred embodiment 6 of the present invention.

A voltage setting device 15 which is a feature of embodiment 6 may be incorporated in the controller 1 or may be provided outside of the controller with communications means for communicating with the controller 1. When parameters of the voltage command $V_{hd}^*$ such as its pulse amplitude and pulse period are input to the voltage setting device 15, the voltage setting device 15 pass these input parameter values to the ripple current generator 11. The ripple current generator 11 changes the voltage command $V_{hd}^*$ to meet the received input parameter values. This device can realize a function that can change the voltage command $V_{hd}^*$ from the external.

Figure 12:
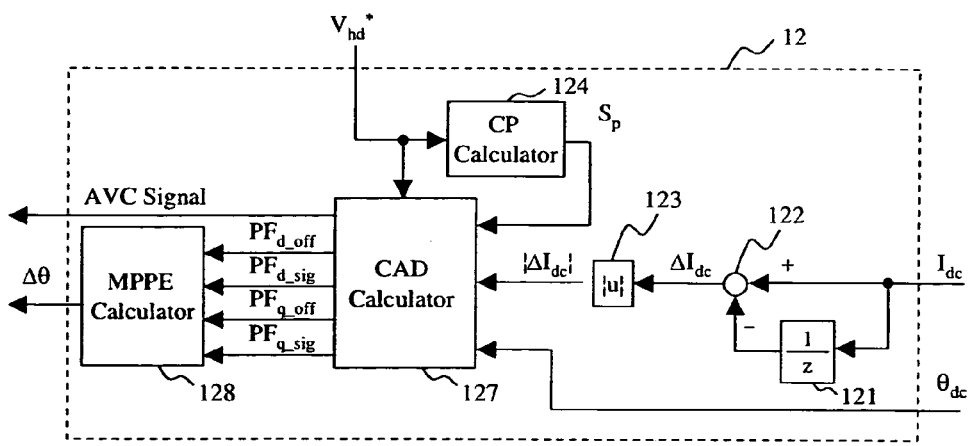
FIG. 12 is a configuration diagram of a magnetic pole position estimator according to embodiment 6 of the present invention.

FIG. 12 shows a configuration of the magnetic pole position estimator 12 according to embodiment 6. The current amplitude difference calculator 127 calculates $PF_{d\_off}$, $PF_{d\_sig}$, $PF_{q\_off}$, and $PF_{q\_sig}$ and compares these values with predetermined values. If all the values of $PF_{d\_off}$, $PF_{d\_sig}$, $PF_{q\_off}$, and $PF_{q\_sig}$ are smaller than the predetermined values respectively, the current amplitude difference calculator 127 determines that estimating the position error $\Delta\theta$ will not be executed properly, because the permanent magnet flux $\phi_m$ does not have a significant effect on the dc axial current $I_{dc}$, and outputs an adjustment voltage command signal to the ripple current generator 11. When the adjustment voltage command signal is input to the ripple current generator 11, the ripple current generator 11 increases by a predetermined rate the amplitude of the voltage command $V_{hd}^*$ from next time. Through this arrangement, such a function can be realized that the voltage command $V_{hd}^*$ is automatically adjusted so that estimating the position error $\Delta\theta$ can be executed properly.

Embodiment 7

Figure 13:
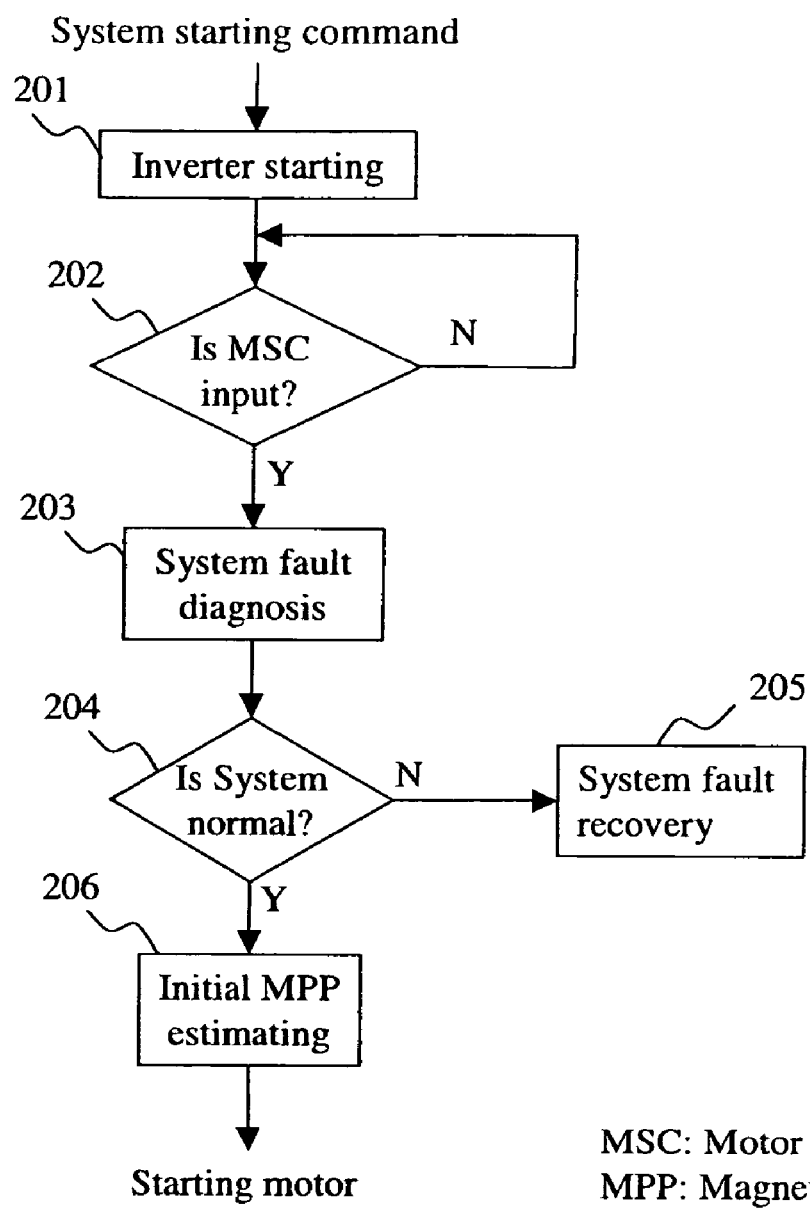
FIG. 13 is a flowchart to explain controller operation according to embodiment 7 of the present invention.
Figure 14:
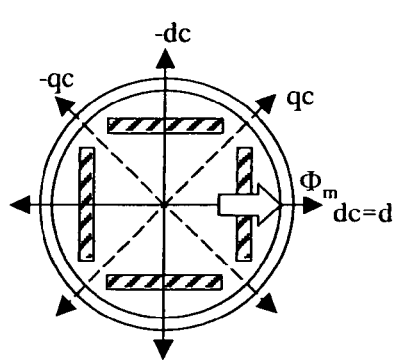
FIG. 14A shows an internal view of the motor to control.
FIG. 14B shows a current-flux relation.
FIG. 14C shows the waveform of the current in order to explain a relation between magnetic saturation and ripple current for a case where a magnetic pole axis is aligned with the estimated axis, which is assumed in prior art.
Figure 14:
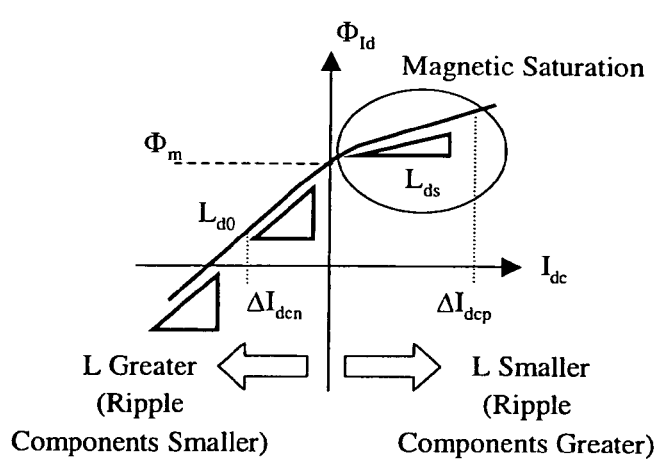
Figure 14:
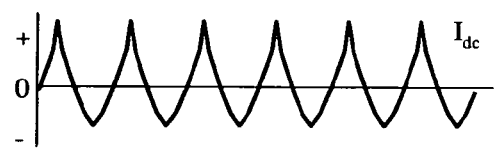

FIG. 13 shows a flowchart of the operation of the controller 1 according to a preferred embodiment 7 of the present invention.

When a system starting command is input to the controller 1, an inverter starting process 201 is first performed and, upon the completion of the process, the controller 1 performs a motor starting command process 202 and waits until the motor starting command is input.

When the motor starting command is input to the controller 1, a system fault diagnosis process 203 which is a feature of embodiment 7 is performed. The system fault diagnosis process 203 checks for faults such as a short circuit, grounding, and disconnection in the output circuit of the inverter 2, abnormal conditions such as overvoltage or undervoltage of input voltage, or faults in the converter 1 itself. After the termination of the system fault diagnosis process 203, the procedure proceeds to a system fault judgment process 204. If a fault is detected, the procedure proceeds to a system fault recovery process 205. If not, an initial magnetic pole position estimating process 206 is performed. An initial value of the position error $\Delta\theta$ is estimated through, for example, any one of the methods described in embodiments 1 to 5. After this process, the controller starts the motor.

Without the system fault diagnosis process 203 and the system fault judgment process 204, the motor starts to operate even if any fault occurs in the system. If, for example, a fault occurs in the current detector 4, the initial magnetic pole position estimating process 206 cannot estimate the position error $\Delta\theta$ properly and, moreover, the function that automatically adjusts the voltage $V_{hd}^*$, described in embodiment 6, may malfunction. According to embodiment 7, the reliability of the method of estimating the magnetic pole position according to the present invention can be enhanced.

As discussed hereinbefore, the present invention is configured to detect the magnetic pole position and perform vector control by the controller to control the motor. According to the present invention, the procedure for detecting the magnetic pole position comprises steps of applying a pulsating voltage as the voltage command to cause the voltage change along the dc axis that is the estimated magnetic pole axis of the motor, observing current flowing across the motor along the dc axis, separating the ripple components of the current observed on the dc axis into the positive and negative sides of the ripple components, detecting two or more different absolute values of the current for each side and estimating the magnetic pole position inside the motor, based on the thus detected two or more different absolute values of the current.

The above two ore more different absolute values of the current should be detected from one ripple current waveform. Alternatively, it may also be preferable to apply voltages with two or more different amplitudes to cause the voltage change along the dc axis and detect one pair of positive and negative current values for each voltage.

By moving the dc axis to cause the voltage change in two or more directions, it is possible to detect the magnetic pole position including polarity.

The controller is provided with the function to set from externally the parameters of the voltage command to cause the voltage change across the dc axis and the function to automatically adjust the voltage command within the controller, so that the magnetic pole position can be detected even if change is made to the motor.

The controller is provided with the fault detection function to prevent malfunction of the magnetic pole position detecting operation including the above automatic voltage adjustment function.

As described hereinbefore, according to the AC motor driving system of the present invention, by applying the voltage change to the motor, two or more different absolute values of ripple components of the current generated by the voltage change are observed in the positive and negative sides of the current. Based on a current variation rate calculated from the above current values, the magnetic pole position inside the motor can be estimated.

The above system takes advantage of ripple current variation due to magnetic saturation and can remove a portion of the ripple current that depends on motor structure. Accordingly, this system is applicable independent of motor structure and can enhance the accuracy of estimating the magnetic pole position without increasing the amplitude of the ripple current.

The controller is provided with the function to set from externally the parameters of the voltage command to cause the voltage change and the function to automatically adjust the voltage command within the controller. Accordingly, the magnetic pole position can be detected even if change is made to the motor. The controller is also provided with the fault detection function that can prevent malfunction of the magnetic pole position detecting operation including the above automatic voltage adjustment function.

A system comprising an AC motor, an inverter for supplying arbitrary AC power to the AC motor, and a controller for sending a control signal to the inverter is referred to as an AC motor system.

The present invention can provide an AC motor control apparatus and an AC motor system that are capable of estimating the magnetic pole position with accuracy.

What is claimed is:

1. An AC motor control apparatus comprising a controller which sends a control signal to an inverter which supplies arbitrary AC power to an AC motor, said controller comprising:

a ripple current generator for supplying a ripple current to said AC motor; and a magnetic pole position estimator,
wherein said ripple current generator outputs a voltage command $V_{hd}*$, and
wherein said magnetic pole position estimator receives said voltage command $V_{hd}*$, an exciting current component $I_{dc}$ of a motor current, and a torque current component $1_{qc}$ of said motor current as input, and said magnetic pole position estimator outputs a position error $\Delta\ominus$ to estimate the magnetic pole position of said AC motor.

2. The AC motor control apparatus according to claim 1, wherein said magnetic pole position estimator obtains a current variation rate, based on said at least two current values, to estimate the magnetic pole position of said AC motor, based on said current variation rate.

3. The AC motor control apparatus according to claim 1, wherein said ripple current generator outputs a rectangular waveform voltage as a voltage command.

4. The AC motor control apparatus according to claim 3, wherein said inverter performs pulse width modulation using a carrier and said rectangular waveform voltage has a pulse period that is four times or greater even integral times a waveform period of the carrier.

5. The AC motor control apparatus according to claim 1, wherein said ripple current generator outputs a stepwise waveform voltage as the voltage command.

6. The AC motor control apparatus according to claim 5, wherein said inverter performs pulse width modulation using a carrier and said stepwise waveform voltage has a pulse period that is four times or greater even integral times a waveform period of the carrier.

7. The AC motor control apparatus according to claim 1, further comprising a current amplitude difference calculator for setting or changing the amplitude of the voltage to be applied.

8. The AC motor control apparatus according to claim 2, wherein said ripple current generator adjusts the amplitude of a voltage as the voltage command so that the current variation rate of said ripple current falls within a predetermined range.

9. The AC motor control apparatus according to claim 1, wherein said magnetic pole position estimator for estimating the magnetic pole position inside said motor starts operation after performing a fault detection process to check for a fault in said inverter and said controller.

10. An AC motor control apparatus comprising a controller which sends a control signal to an inverter which supplies arbitrary AC power to an AC motor, said controller comprising:
a ripple current generator for supplying a ripple current to said AC motor; and
a magnetic pole position estimator,
wherein said ripple current generator outputs rectangular waveform voltages with different amplitudes in sequence as a voltage command $V_{hd}*$ and said magnetic pole position estimator receives said voltage command $V_{hd}*$ an exciting current component $I_{dc}$ of a motor current, and a torque current component $1_{qc}$ of said motor current as input, and said magnetic pole position estimator outputs a position error $\Delta\ominus$ to estimate the magnetic pole position of said AC motor.

11. The AC motor control apparatus according to claim 10, wherein said magnetic pole position estimator obtains a current variation rate, based on said at least one current value, to estimate the magnetic pole position of said AC motor, based on said current variation rate.

12. The AC motor control apparatus according to claim 10, wherein said inverter performs pulse width modulation using a carrier and said rectangular waveform voltages with different amplitudes have a pulse period that is two times or greater integral times a waveform period of the carrier.

13. The AC motor control apparatus according to claim 11, wherein observing at least one current value of said ripple current is observing only around positive and negative peaks of said ripple current.

14. The AC motor control apparatus according to claim 1, wherein said ripple current is applied along two or more arbitrary phase axes.

15. The AC motor control apparatus according to claim 10, wherein two rectangular waveform voltages with different amplitudes are applied for a predetermined period alternately along a dc axis that is a magnetic pole axis estimated by the controller and along a qc axis perpendicular to the dc axis.

16. The AC motor control apparatus according to claim 15, wherein said two rectangular waveform voltages with different amplitudes are distinguished as a first rectangular waveform voltage and a second rectangular waveform voltage, a period during which said first rectangular waveform voltage is applied along said dc axis is denoted by d1, a period during which said second rectangular waveform voltage is applied along said dc axis is denoted by d2, a period during which said first rectangular waveform voltage is applied along said qc axis is denoted by q1, a period during which said second rectangular waveform voltage is applied along said qc axis is denoted by q2, and the voltages are applied in sequence of said period d1, said period d2, said period q1, and said period q2 or in sequence of said period d1, said period q1, said period d2, and said period q2.

17. The AC motor control apparatus according to claim 10, further comprising a current amplitude difference calculator for setting or changing the amplitude of the voltage to be applied.

18. The AC motor control apparatus according to claim 10, wherein said ripple current generator adjusts the amplitude of a voltage as the voltage command so that the current variation rate of said ripple current falls within a predetermined range.

19. The AC motor control apparatus according to claim 10, wherein said magnetic pole position estimator to estimate the magnetic pole position inside said motor starts operation after performing a fault detection process to check for a fault in said inverter and said controller.

20. An AC motor control apparatus comprising a controller which sends a control signal to an inverter which supplies arbitrary AC power to an AC motor, said controller comprising:
a ripple current generator for supplying a ripple current to said AC motor; and
a magnetic pole position estimator,
wherein said ripple current generator outputs a stepwise waveform voltage as the voltage command $V_{hd}*$ or outputs rectangular waveform voltages with different amplitudes in sequence as a voltage command $V_{hd}*$ and said magnetic pole position estimator receives said voltage command $V_{hd}*$, an exciting current component $I_{dc}$ of motor current, and a torque current component $I_{qc}$ of said motor current as input, and said magnetic pole position estimator outputs a position error $\Delta\ominus$ to estimate the magnetic pole position of said AC motor.

* * * * *